(12) United States Patent
Meunier

(10) Patent No.: US 6,584,038 B2
(45) Date of Patent: Jun. 24, 2003

(54) DEVICE FOR RECEIVING SEISMIC WAVES AND METHOD FOR COUPLING THEM WITH A SOLID ENVIRONMENT

(75) Inventor: Julien Meunier, Paris (FR)

(73) Assignees: Institut Francais du Petrole, Rueil-Malmaison cedex (FR); Gaz de France Compagnie Generale de Geophysique, Massy cedex (FR)

(*) Notice: Subject to any disclaimer, the term of this patent is extended or adjusted under 35 U.S.C. 154(b) by 0 days.

(21) Appl. No.: 09/958,853
(22) PCT Filed: Feb. 9, 2001
(86) PCT No.: PCT/FR01/00380
§ 371 (c)(1), (2), (4) Date: Oct. 15, 2001
(87) PCT Pub. No.: WO01/59482
PCT Pub. Date: Aug. 16, 2001

(65) Prior Publication Data
US 2002/0159331 A1 Oct. 31, 2002

(30) Foreign Application Priority Data
Feb. 14, 2000 (FR) .............................................. 00 01793

(51) Int. Cl.⁷ .................................................. G01V 1/16
(52) U.S. Cl. .................. 367/25; 367/166; 367/171; 367/178; 181/401; 181/402
(58) Field of Search ............... 367/25, 166, 178, 367/171; 181/401, 402

(56) References Cited

U.S. PATENT DOCUMENTS

| | | | | | |
|---|---|---|---|---|---|
| 3,942,606 A | * | 3/1976 | Dick | .......................... | 181/122 |
| 4,078,223 A | * | 3/1978 | Strange | ....................... | 367/171 |
| 4,134,097 A | * | 1/1979 | Cowles | ........................ | 367/178 |
| 4,534,020 A | * | 8/1985 | O'Brien | ....................... | 367/188 |
| 4,775,009 A | * | 10/1988 | Wittrisch et al. | ........... | 166/250 |
| 4,962,752 A | * | 10/1990 | Reichenberger et al. | ...... | 128/24 |
| 5,126,980 A | * | 6/1992 | Sallas et al. | ................. | 367/178 |
| 5,187,332 A | * | 2/1993 | El-Rabaa et al. | ........... | 181/122 |
| 5,442,590 A | * | 8/1995 | Svenning et al. | ............. | 367/20 |

* cited by examiner

Primary Examiner—Nelson Moskowitz
(74) Attorney, Agent, or Firm—Antonelli, Terry, Stout & Kraus, LLP

(57) ABSTRACT

Seismic wave reception device comprising a hydrophone and/or a geophone and method for coupling it (or them) with a solid medium such as the subsoil.

The device comprises at least one hydrophone (2) immersed in a closed flexible-walled sheath (7) filled with liquid (8) that is closed at one end by a sealed plug (9) provided with a sealed duct for a cable (10) connecting the hydrophone to a signal acquisition means (E). The sheath is arranged in a cavity (6) and tightly coupled with medium (5) substantially over the total surface thereof, preferably by means of a hardenable material such as cement. A geophone can be placed in the same coupling material in the vicinity of sheath (7) containing hydrophone (2).

Application: seismic prospecting or monitoring operations in an underground formation, notably in order to discriminate the seismic upgoing and downgoing waves.

20 Claims, 3 Drawing Sheets

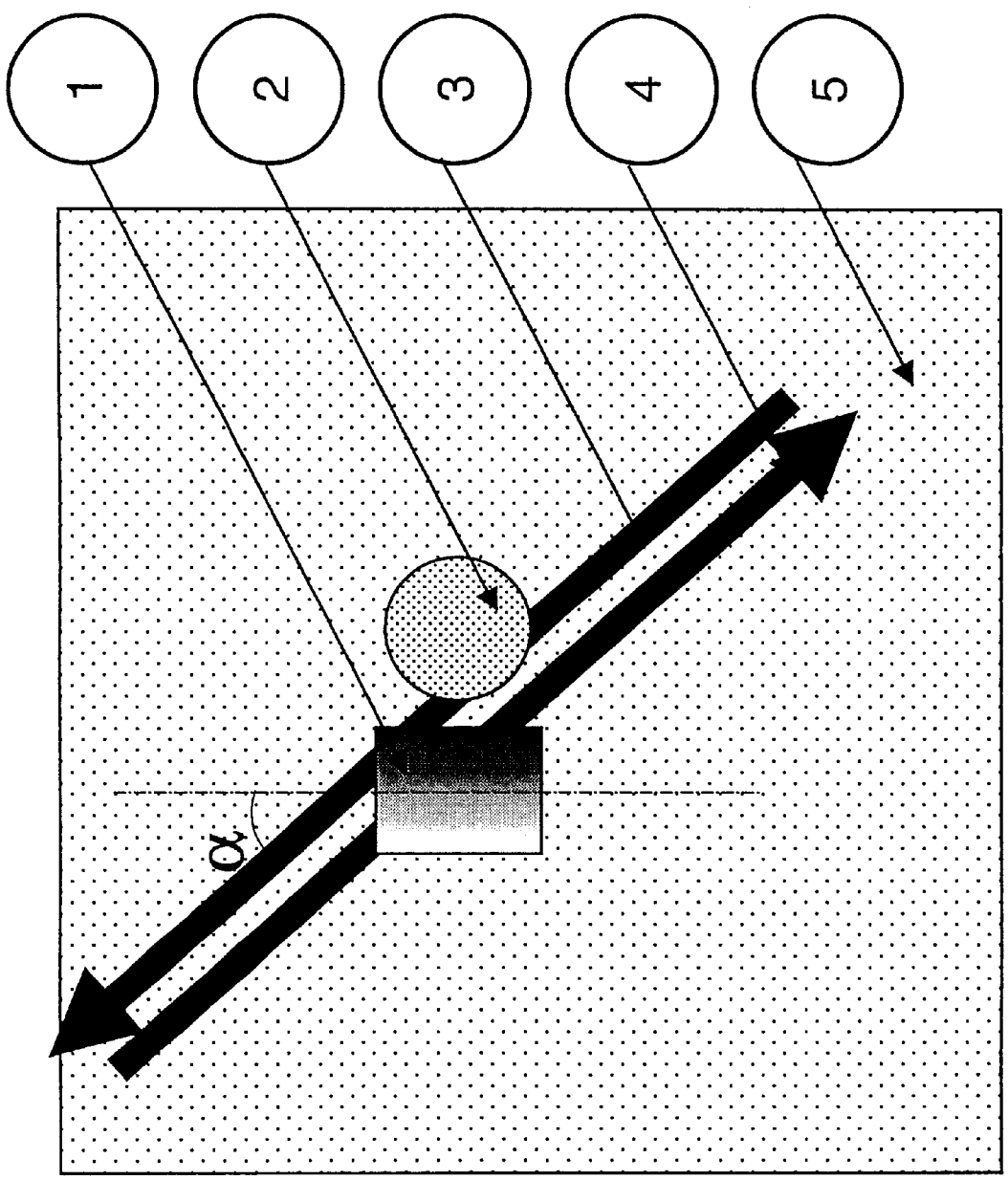

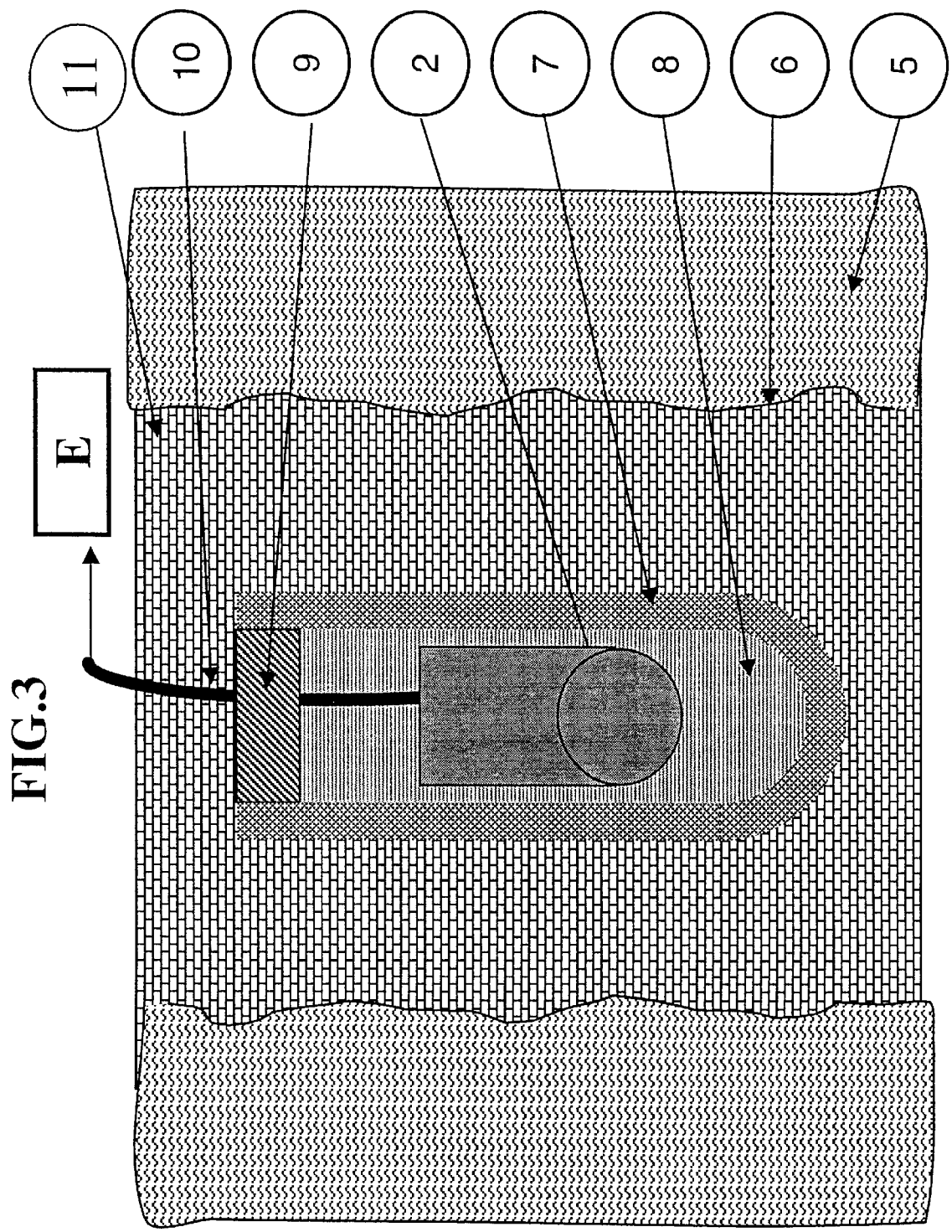

DEVICE FOR RECEIVING SEISMIC WAVES AND METHOD FOR COUPLING THEM WITH A SOLID ENVIRONMENT

FIELD OF THE INVENTION

The present invention relates to a seismic wave reception device comprising a hydrophone and/or a geophone and to a method for coupling it (or them) with a solid medium such as the subsoil.

The device according to the invention finds applications notably in seismic monitoring or exploration operations in an underground formation.

BACKGROUND OF THE INVENTION

It is well-known to monitor the long-term state variations of a reservoir during production, either a hydrocarbon reservoir or a reservoir intended for storage of gas or of other substances, etc, by means of a seismic system comprising a seismic impulsive source or a seismic vibrator emitting elastic waves in the ground and a reception device comprising seismic pickups arranged at the surface or in wells and coupled with the formations to be monitored, in order to pick up the waves reflected by the discontinuities and to record them, so as to form representative seismograms. At predetermined time intervals, seismic investigations are carried out so as to determine by comparison the changes that have occurred in the reservoir as a result of the development thereof.

Geophones coupled with the formation, at the surface or in wells, are generally used as seismic pickups. The geophones can be lowered into the wells suspended from a cable or fastened to a tubing and tightly pressed against the wall of the well by articulated pads or springs. They can also be lowered into a well fastened to the outside of a casing and embedded in the cement injected into the annular space between the casing and the well wall. The geophones can also be installed in a well drilled therefore and filled with cement.

It is also well-known to use hydrophones that are coupled with the formations by means of the fluids that fill the wells.

Various long-term seismic monitoring systems are described for example in pats. EP-591-037 (U.S. Pat. No. 5,461,594), FR-2,593,292 (U.S. Pat. No. 4,775,009), FR-2,728,973 (U.S. Pat. No. 5,724,311), FR-2,775,349 or U.S. Pat. No. 4,534,020.

The combined use of a geophone 1 and of a hydrophone 2 at the same point affords considerable advantages for separating seismic waves 3, 4 propagated along a common direction but in the opposite direction in relation to one another (FIG. 1). In fact, geophone 1 measures the projection, on the axis of the geophone, of the velocity vector of the particles of the explored medium under the effect of the waves, and hydrophone 2 measures the pressure. In a homogeneous medium 5 where the propagation velocity is constant, these two quantities are connected by the relation:

$P = \epsilon Z\ V/\cos\alpha$, where:

P is the pressure, z the seismic impedance of the medium, $\epsilon$ a coefficient equal to +1 or −1, according to the direction of propagation of the wave, V the velocity of the particle on an axis parallel to the direction of propagation thereof, and $\alpha$ the angle between the axis of the geophone and the direction of propagation.

This is the case in conventional Vertical Seismic Prospecting (VSP) operations where the pickups installed along a well detect downgoing waves as well as upgoing waves, and it is well-known that, by using pairs of geophones and hydrophones positioned at a distance from one another along a well, it is possible to simply separate the waves of these two types by means of a linear combination of the velocity and pressure measurements, and:

$D_{esc} = P - zV/\cos\alpha$ $M_{ont} = P + zV/\cos\alpha$

The seismograms of FIGS. 2A, 2B correspond to data recorded in a vertical well respectively by a geophone (velocity data V) and a hydrophone (pressure data P). The seismograms of FIGS. 2C, 2D respectively correspond to the difference (P−V) and to the sum (P+V).

Whereas data V and P both comprise upgoing waves (M) and downgoing waves (D), their difference only comprises downgoing waves (FIG. 2C) and their sum, upgoing waves (FIG. 2D).

Putting this wave discrimination into practice through the combined use of hydrophones and of geophones however leads to coming up against the problem of coupling the hydrophones with the medium.

In the case of measurements in wells, coupling of the hydrophones with the formations is obtained by means of the mud filling the well, which is a serious disadvantage because it is directly exposed to waves referred to as fluid waves whose amplitude is most often much higher than that of the waves propagated in the medium and which are to be observed. amplitude is most often much higher than that of the waves propagated in the medium and which are to be observed.

SUMMARY OF THE INVENTION

The device and the coupling method according to the invention allow to couple very efficiently hydrophones and/or geophones with a medium such as an underground formation for example, notably by avoiding the parasitic effects linked, in applications to well seismics, with the direct immersion thereof in mud.

The seismic wave reception device comprises at least one hydrophone, a closed flexible-walled sheath filled with a liquid and intended to be tightly coupled with the medium substantially over the total surface thereof, in which the hydrophone is immersed, the sheath being closed at one end by a sealed plug provided with a sealed duct for a cable connecting the hydrophone to a signal acquisition means.

The reception device can also comprise at least one geophone that is coupled with the medium in the vicinity of the closed sheath containing the hydrophone, and which is connected to the signal acquisition means.

The geophone and/or the hydrophone in its closed sheath can be, for example, tightly coupled with the medium by a hardenable material such as cement interposed between them and a cavity provided in the medium.

The method according to the invention allows to couple a seismic wave reception device comprising at least one hydrophone with a solid medium such as the subsoil, in which a cavity allowing it to be buried in the medium is provided. The hydrophone is immersed in a closed flexible-walled sheath filled with a liquid, which is closed at one end by a sealed plug provided with a sealed duct for a cable connecting the hydrophone to a signal acquisition device, and substantially the total flexible wall of the sheath is coupled with the medium by injecting into the cavity around the sheath a hardenable material such as cement.

At least one geophone arranged in the vicinity of the sheath containing the hydrophone can also be coupled with the medium by means of the same hardenable material.

The reception device is for example placed in an intermediate space between a well and a tube lowered into the well, and it is coupled with the medium by injecting the material into at least part of this space.

BRIEF DESCRIPTION OF THE DRAWINGS

Other features and advantages of the method and of the device according to the invention will be clear from reading the description hereafter, given by way of non limitative example, with reference to the accompanying drawings wherein:

FIG. 1 diagrammatically illustrates the paths followed by elastic waves propagated in an underground formation and received by pickups coupled with this formation, FIG. 3 shows an example of coupling of a hydrophone with the medium.

DETAILED DESCRIPTION

Figure 2D:
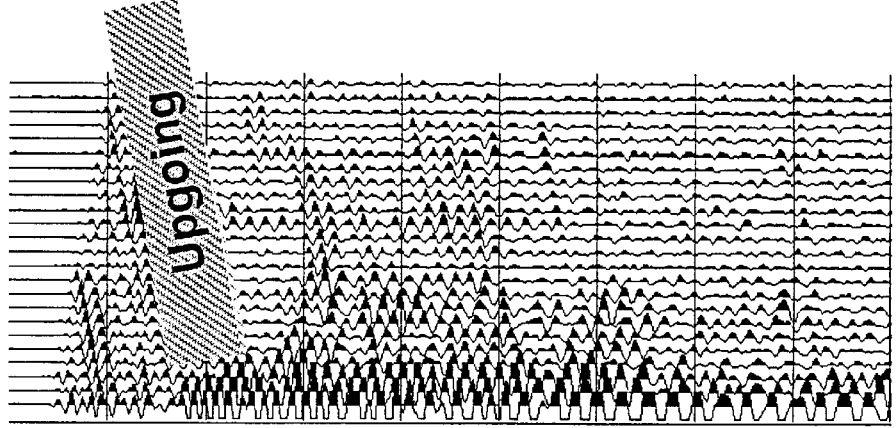
FIGS. 2A–2D show examples of seismograms formed from signals respectively received by velocity pickups or geophones (FIG. 2A), by pressure pickups or hydrophones (FIG. 2B), by subtraction of velocity and pressure signals (FIG. 2C) and by summation of these signals (FIG. 2D)

The coupling method used here for coupling one or more hydrophones 2 of a seismic reception device with a solid medium 5 such as the subsoil essentially consists in immersing hydrophone 2 in a closed flexible-walled sheath 7 entirely filled with a liquid 8, which is tightly coupled with the medium. This sheath or bag 7 comprises a hole through which hydrophone 2 and filling liquid 8 are introduced. A sealed plug 9 such as a packer for example insulates the inside of sheath 7. Plug 9 is provided with a liquid-proof duct 6 intended for an electric cable 10 connecting the hydrophone(s) to an outside signal acquisition device E placed at the surface for example.

The reception device can be coupled with medium 5 by filling in space 6 where sheath 7 is arranged. Sheath 7 is preferably coupled with medium 5 by pouring around the sheath a solid material 11 which can be either fill material or a hardenable material such as cement for example. Bag 7 must be sufficiently small to be introduced into the space provided and sufficiently large for the active part of the hydrophone to be entirely in contact with the liquid.

A geophone 1 that is also connected to acquisition device E is preferably associated with hydrophone 2 in its sheath 7, and they are coupled with the medium by means of the same coupling material 11.

Figure 2C:
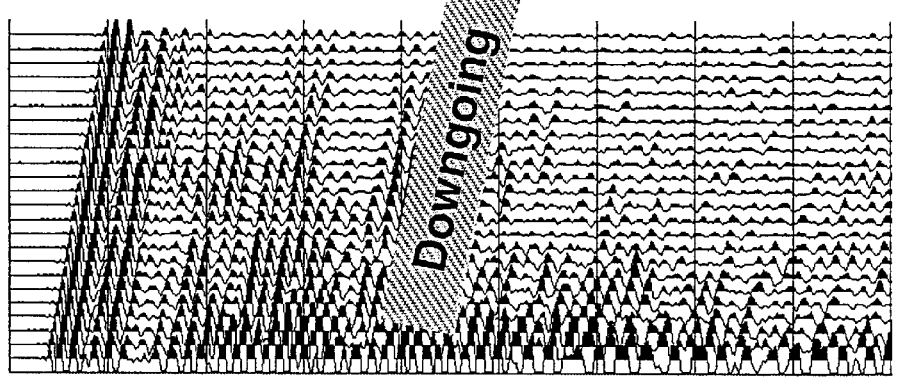
Figure 2B:
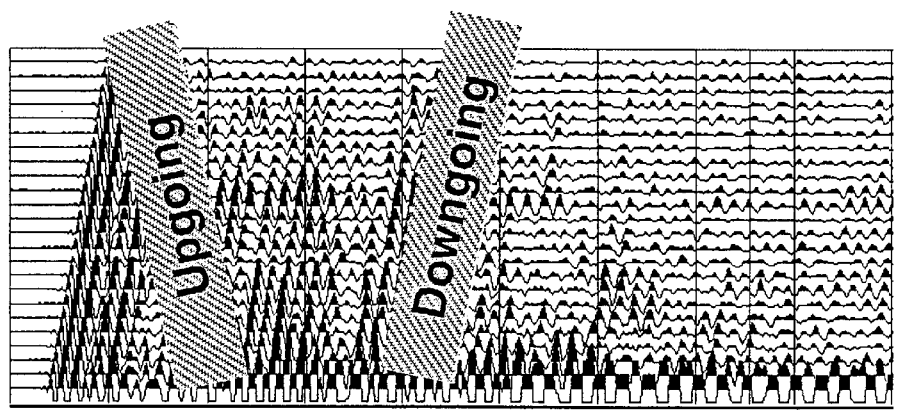
Figure 2A:
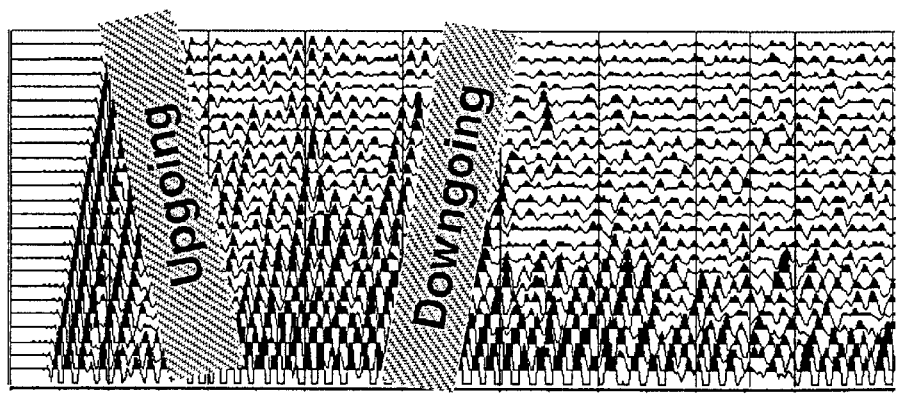

The seismograms of FIGS. 2A to 2D are obtained by means of such a device comprising such a combination of a geophone and of a hydrophone.

Space 6 in which the device is arranged can be a hole or well intended only for installing pickups, or possibly an annular space around a tube lowered into the well (a casing tube for example) and used for production of an underground reservoir (fluid transfer operations between the surface and the bottom).

Burial of the sheath in the ground by means of the filling material and notably by means of cement allows to obtain tight coupling of the hydrophone and/or of the geophone with the formation without directly exposing the hydrophone to the powerful tube waves travelling through the fluids in the wells. The device allows the receivers to be buried at a distance from the surface and thus to make them practically insensitive to the surface noise.

What is claimed is:

1. A reception device intended for sensing seismic waves coming from a solid medium, comprising at least one hydrophone in a cavity of the medium and coupled therewith, a closed flexible-walled sheath which tightly couples with the medium substantially over the total surface thereof, the sheath being filled with a liquid in which hydrophone is immersed, and closed at one end by a sealed plug provided with a sealed duct for a cable connecting the hydrophone to a signal acquisition device; and wherein the closed sheath containing the at least one hydrophone is coupled with the medium by injecting a hardenable material.

2. A reception device as claimed in claim 1 wherein:

the material is cement.

3. A reception device as claimed in claim 1 comprising at least one geophone coupled with the medium in a vicinity of the closed sheath containing the at least one hydrophone, and connected to the signal acquisition device.

4. A reception device as claimed in claim 3 wherein:

the at least one geophone and the closed sheath containing the at least one hydrophone are tightly coupled with the medium by injecting a hardenable material.

5. A reception device as claimed in claim 4 wherein:

the material is cement.

6. A method for coupling a seismic wave reception device comprising at least one hydrophone with a solid medium in a cavity to be buried in the medium comprising: immerging the hydrophone in a closed flexible-walled sheath filled with a liquid, closed at one end by a sealed plug provided with a sealed duct for a cable connecting the hydrophone to a signal acquisition device, and coupling substantially all of the flexible wall of the sheath with the medium by injecting a hardenable material into the cavity around the sheath.

7. A method as claimed in claim 6 wherein:

the material is cement.

8. A method as claimed in claim 6 where at least one geophone in a vicinity of the sheath containing the at least one hydrophone is coupled with the medium by the hardenable material.

9. A method as claimed in claim 7 where at least one geophone in a vicinity of the sheath containing the at least one hydrophone is coupled with the medium by the hardenable material.

10. A method as claimed in claim 6 wherein:

the reception device is placed in an intermediate space between a well and a tube lowered into the well, and is coupled with the medium by injecting the hardenable material into at least part of the intermediate space.

11. A method as claimed in claim 7 wherein:

the reception device is placed in an intermediate space between a well and a tube lowered into the well, and is coupled with the medium by injecting the hardenable material into at least part of the intermediate space.

12. A method as claimed in claim 8 wherein:

the reception device is placed in an intermediate space between a well and a tube lowered into the well, and is coupled with the medium by injecting the hardenable material into at least part of the intermediate space.

13. A method as claimed in claim 9 wherein:
the reception device is placed in an intermediate space between a well and a tube lowered into the well, and is coupled with the medium by injecting the hardenable material into at least part of the intermediate space.

14. A reception device intended for sensing seismic waves coming from a subsurface formation, comprising at least one hydrophone in a cavity provided in the subsurface formation, a closed flexible-walled sheath, the sheath being filled with a liquid in which the hydrophone is immersed, a rigid material filling the cavity around the sheath for coupling the flexible-walled sheath to the subsurface formation, and the device is closed at one end by a sealed plug provided with a sealed duct for a cable connecting the hydrophone to a signal acquisition device.

15. A reception device intended for sensing seismic waves coming from a subsurface formation, comprising at least one hydrophone in one of a hole or well provided in the subsurface formation, a closed flexible-walled sheath, the sheath being filled with a liquid in which the hydrophone is immersed, a rigid material filling the one of a hole or well around the sheath for coupling the sheath to the subsurface formation, and the device is closed at one end by a sealed plug provided with a sealed duct for a cable connecting the hydrophone to a signal acquisition device.

16. A reception device intended for sensing seismic waves coming from a subsurface formation comprising a closed flexible-walled sheath filled with a liquid and closed at one end by a sealed plug, at least one hydrophone immersed in the liquid and connected by a cable with a signal acquisition device through a sealed duct in a plug and suspended in the liquid by the cable and wherein in use the flexible-walled sheath is buried in a hole or well in the subsurface formation and coupled therewith substantially over the total surface thereof.

17. A reception device intended for sensing seismic waves coming from a subsurface formation comprising a closed flexible-walled sheath filled with a liquid and closed at one end by a sealed plug, at least one hydrophone immersed in the liquid and connected by a cable with a signal acquisition device through a sealed duct in a plug and suspended in the liquid by the cable, and wherein in use the flexible-walled sheath is buried in a cavity in the subsurface formation and coupled therewith substantially over the total surface thereof through a rigid material filling the cavity around the flexible-walled sheath.

18. A reception device as claimed in claim 17 wherein the closed sheath is coupled with a wall of the cavity by an injected hardenable material.

19. An installation for seismic monitoring a hydrocarbon production reservoir, comprising at least one hydrophone in a borehole provided adjacent the reservoir, a flexible-walled sheath closed at one end by a sealed plug provided with a sealed duct for a cable connecting the hydrophone to a signal acquisition device, the sheath being filled with a liquid in which the hydrophone is immersed and a rigid material filling the borehole around the sheath for coupling the sheath to the subsurface.

20. An installation for monitoring a hydrocarbon production reservoir, comprising a flexible-walled sheath filled with a liquid and closed at one end by a sealed plug, at least one hydrophone immersed in the liquid and connected by a cable with a signal acquisition device through a sealed duct in the plug and suspended in the liquid by the cable and the flexible-walled sheath is buried in a hole or well in the subsurface formation and coupled therewith substantially over the total outside surface thereof through a rigid material filling the cavity around the flexible-walled sheath.

* * * * *